I. ETRICH.
PROCESS OF AND MACHINE FOR TREATING FLAX STRAW AND THE LIKE.
APPLICATION FILED NOV. 18, 1919.

1,331,332. Patented Feb. 17, 1920.

INVENTOR
IGNAZ ETRICH.
BY
ATTORNEYS.

UNITED STATES PATENT OFFICE.

IGNAZ ETRICH, OF OBERALTSTADT, NEAR TRAUTENAU, BOHEMIA.

PROCESS OF AND MACHINE FOR TREATING FLAX-STRAW AND THE LIKE.

1,331,332.　　　　　　　Specification of Letters Patent.　　Patented Feb. 17, 1920.

Application filed November 18, 1919. Serial No. 338,931.

*To all whom it may concern:*

Be it known that I, IGNAZ ETRICH, a subject of the Czecho-Slovak Republic, residing at Oberaltstadt, near Trautenau, Bohemia, have invented certain new and useful Improvements in Processes of and Machines for Treating Flax-Straw and the like; and I do hereby declare the following to be a full, clear, and exact description of the invention, such as will enable others skilled in the art to which it appertains to make and use the same.

Figure 1:
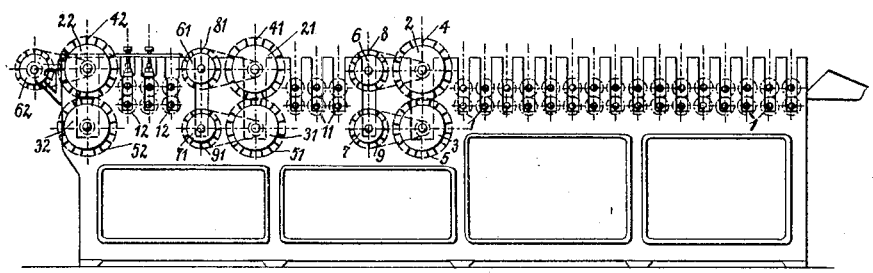
Figure 2:
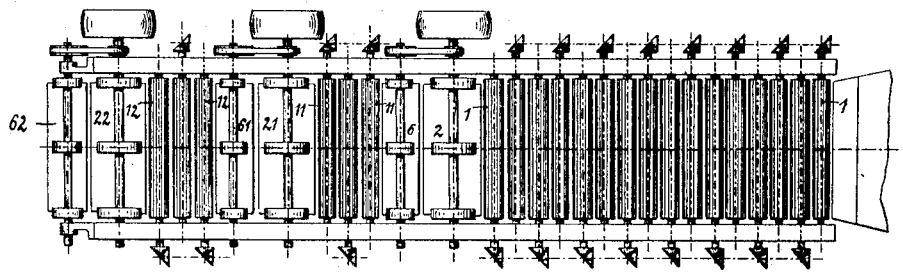

The present invention relates to the mechanical treatment of retted vegetable fibrous bast material such as flax straw, short flax stalks, flax tow, hemp and the like, which owing to the shortness of its elements, cannot be scutched and has for its object to produce from such raw material in one continuous operation a pure material for spinning purposes which is greatly superior to any other heretofore produced from similar raw materials. It is of great commercial importance that from the short flax stalks or flax straw forming the by product or of all linseed culture for oil producing purposes by the present invention a valuable spinning material can be cheaply obtained in one continuous operation which spinning material may be used as a substitute for cotton or jute and is superior in quality to both of them. After the removal of the seeds and after having undergone a simple dew or water retting this flax straw or short flax stalks are dried and then are ready for further treatment according to the present invention which will now be more fully described reference being had to the accompanying drawing in which Figure 1 is a diagrammatical side elevation and Fig. 2 a plan view of a machine embodying my invention.

The raw material is fed to a series of breaking rollers 1 and at the delivery end of this series of rollers a pair of scutching drums 2, 3 is located, which are provided with stripping drums 6, 7 for stripping the material from the scutching drums, the material is then delivered to another series of breaking rollers 11. The scutching drums of each pair are arranged the one vertically above the other their axes being parallel to each other and to those of the breaking rollers. Each of the drums is provided with radial equidistant blades 4, 5 the blades of one drum entering into the spaces between the blades of the other drum and the two drums revolve with equal circumferential speeds. This scutching device is well known *per se*.

The circumferential velocity of the blades 4, 5 is much greater than that of the breaking rollers whereby the wood particles, the shive and other impurities are torn off and thrown away. Immediately in rear of the two scutching drums stripping drums 6, 7 one for each of the scutching drums are provided the axes of which are likewise parallel to the axes of the scutching drums. The stripping drums are provided with radial blades 8, 9 which, however, do not enter between the blades 4, 5 of the drums 2, 3 but closely pass by the outer edges of the latter. The stripping drums 6, 7 revolve in the same direction as the drums 2 and 3 respectively, but the circumferential velocity of the outer edges of the blades 8, 9 is less than that of the other edges of the blades 4, 5. All the breaking rollers of one series have the same circumferential velocity but these velocities may be different in the various series. The breaking rollers, the scutching drums and the stripping drums may be driven in any convenient or preferred manner from a main shaft, for instance the breaking rollers by bevel gearing and the drums by belt and pulley gearing as indicated in the drawing.

The breaking rollers 1 deliver the raw material to the scutching apparatus 2, 3 where it is thoroughly cleaned. As the raw material is vigorously compressed by the breaking rollers 1, it forms a coherent sheet resembling a fleece which runs uniformly through the breaking rollers; even individual fibers, the rear ends of which have passed the rear pair of breaking rollers next to the scutching drums will not be drawn out from the fleece like sheet by the rapidly revolving scutching drums to any considerable extent.

The stripping drums strip any material adhering to the blades 4, 5 off the latter. The material then enters a second series of breaking rollers 11 the circumferential velocity of which is much smaller than that of the preceding scutching blades 4, 5 conveniently as great or substantially as great as the circumferential velocity of the breaking rollers 1 of the first series. Therefore the material which was compressed while passing through the first series of breaking rollers is loosened (or so to speak jumped up) between the first pair of scutching drums and the second series of breaking rollers 11 which preferably comprises a smaller number of pairs of rollers than the first series 1. The second series of breaking rollers 11 again compresses the material into the form of a fleece like sheet and delivers it to a scutching apparatus 21, 31 with blades 41, 51 and stripping drums 61, 71 provided with blades 81, 91 resembling in every respect the first scutching apparatus 2, 3 and stripping drums 6, 7 and delivering in turn the material to a third series of breaking rollers 12 followed by a third scutching apparatus of the same construction and so on. The number of successive series of breaking rollers and scutching apparatus alternating therewith depends upon the nature of the raw material, by varying the speed of revolutions of the scutching drums the degree to which the raw material is worked may be made to correspond to the quality of the raw material that is to say to its degree of retting, its firmness and its fineness. In the machine illustrated in the drawing there are three series of breaking rollers and three scutching apparatus, the material treated leaves the machine after having been worked upon by the last—in the example shown the third—scutching apparatus comprising two scutching drums 22, 32 of which only the upper one is provided with a stripping drum 62.

By the repeated and alternating compression and loosening or jumping up of the material treated a thorough removal of the shive, the intercellular substance and other impurities is secured and a thoroughly cleaned fibrous material is obtained in which the fibers are not felted, so that this fibrous material may be directly heckled.

A notable advantage secured by the present machine is that it requires only little and unskilled attendance while being very efficient and furnishing an almost perfectly clean fibrous material without putting an undue strain on the fibers.

Claims:

1. A process for mechanically treating flax straw, short flax stalks, flax tow and similar vegetable fibrous materials consisting in moving a layer of the material continuously in one direction and in so doing repeatedly alternately breaking and scutching the same by means of scutching apparatus working on the material in the direction of the movement of the said layer and loosening the said layer every time it is delivered by a scutching apparatus to the next following breaking apparatus.

2. In a machine for mechanically treating flax straw, short flax stalks, flax tow and similar vegetable fibrous material the combination of a plurality of series of pairs of breaking rollers adapted to break the material and to continuously feed it in one direction, a plurality of scutching apparatus alternating with the said series of breaking rollers and adapted to work on the material in the direction of its onward movement, means for operating the breaking and the scutching apparatus and means for loosening the material on its way between each scutching apparatus to the next following breaking apparatus.

3. In a machine for mechanically treating flax straw, short flax stalks, flax tow and similar vegetable fibrous material, the combination of a plurality of series of pairs of breaking rollers having their axes parallel to each other throughout and adapted to break the material and to continuously feed it in one direction, a plurality of scutching apparatus alternating with the said series of breaking rollers, each scutching apparatus comprising a pair of drums having axes parallel to those of the breaking rollers and being provided with radial scutching blades adapted to work on the material in the direction of the movement imparted to it by the breaking rollers, means for revolving the breaking rollers, the circumferential velocity of all the rollers of a series being the same and means for revolving the scutching drums, the circumferential velocity of the blades of the latter being greater than that of the breaking rollers of the series directly preceding and directly following the scutching apparatus.

4. In a machine for mechanically treating flax straw, short flax stalks, flax tow and similar vegetable fibrous material, the combination of a plurality of series of pairs of breaking rollers, having their axes parallel to each other throughout and adapted to break the material and to continuously feed it in one direction, a plurality of scutching apparatus alternating with the said series of breaking rollers each scutching apparatus comprising a pair of scutching drums having axes parallel to those of the breaking rollers and being provided with radial scutching blades adapted to work on the material in the direction of the movement imparted to it by the breaking rollers, stripping drums adjacent to the scutching drums and having their axes parallel to the axes thereof, such stripping drums being provided with substantially radial blades adapted to pass closely by the outer edge of the scutching blades, means for revolving the breaking rollers, the circumferential velocity of all the rollers of a series being the same, means for revolving the scutching drums, the circumferential velocity of the blades of the latter being greater than that of the breaking rollers of the series directly preceding and directly following the scutching apparatus and means for revolving each of the stripping drums in the same direction as and with a smaller circumferential velocity than the scutching drum adjacent thereto.

In testimony whereof I affix my signature in presence of two witnesses.

IGNAZ ETRICH.

Witnesses:
OTTO HEMPFING,
RICHARD CRIEBEL.